United States Patent [19]

Zumbuhl

[11] Patent Number: 5,107,998
[45] Date of Patent: Apr. 28, 1992

[54] TAMPER PROOF RING FOR THREADED CLOSURES

[76] Inventor: Bruno Zumbuhl, 2760 Sugar Cane La., Evansville, Ind. 47715

[21] Appl. No.: 715,610

[22] Filed: Jun. 14, 1991

[51] Int. Cl.⁵ .............................................. B65D 41/34
[52] U.S. Cl. ..................................... 215/252; 215/253
[58] Field of Search ................................ 215/252, 253

[56] References Cited

U.S. PATENT DOCUMENTS

| | | | |
|---|---|---|---|
| 4,526,282 | 7/1985 | Dutt et al. | 215/252 |
| 4,890,754 | 1/1990 | Dorn et al. | 215/252 |
| 4,913,300 | 4/1990 | Wiedmer et al. | 215/252 |
| 4,957,211 | 9/1990 | Ekkert et al. | 215/252 X |
| 4,978,017 | 12/1990 | McBride | 215/252 |

Primary Examiner—Stephen Marcus
Assistant Examiner—Paul A. Schwarz
Attorney, Agent, or Firm—Charles E. Temko

[57] ABSTRACT

An improved tamper proof ring closure construction for use with threaded bottle finishes normally used for containing carbonated beverages or other contents which are under pressure. The ring includes hingedly connected hook-like members integrally molded to the inner surface of the ring. The ring includes an inwardly directed lower flange which supports the hook-like members against movement past a predetermined point when the closure is unthreaded. As the closure is unthreaded, the usual frangible bridge is at least partially ruptured, and continued pressure of the hook-like pressure upon the inwardly directed flange results in rupture of the body of the ring, so that it may be completely removed, thereby facilitating recycling of the container.

3 Claims, 3 Drawing Sheets

TAMPER PROOF RING FOR THREADED CLOSURES

BACKGROUND OF THE INVENTION

This invention relates generally to the field of closures for containers of pressurized containers, typically containers for carbonated beverages, and more particularly to an improved threaded type having a tamper evident ring disposed at a lower periphery which will separate from the main body of the closure when the container is first opened. Devices of this general type are known in the art, and the invention lies in specific constructional details which permit more positive activation of the tamper evident means.

Typical prior art constructions are formed both from metallic and synthetic resinous materials, and sometimes include combinations of these materials. Threaded type closures have at least partially replaced the traditional metallic crown closure, because of improved capacity to reseal the container where only part of the contents have been consumed.

In these constructions, the tamper evident ring is located at the lower circular edge of the body of the closure, and interconnected thereto by a frangible bridge. The ring includes inwardly directed projections which are configured to slide over the threads on the container finish when the closure is installed, but which resist removal when the closure is unthreaded, this movement causing the frangible bridge to rupture and the ring to remain on the container finish as the closure is removed.

One of the principal problems encountered with this type of closure has arisen with the increased desirability of recycling the container after the contents have been consumed, irrespective of whether the container is formed of glass or synthetic resinous materials. Because of differences in materials it is usual to remove the remnants of the tamper evident ring at the recycling location. The removal of the ring is a relatively simple matter where the ring has been positively ruptured, rather than merely separated from the closure body at the time of opening of the container. In most cases, the ring will remain partially attached to the closure body, and may be manually separated prior to resealing the container. With prior art constructions, this rupture does not usually occur, because no provision has been made for the occurrence of this action. More commonly, the inherent resiliency of the material causes it to remain in unruptured condition and attached to the container finish.

SUMMARY OF THE INVENTION

Briefly stated, the invention contemplates the provision of an improved synthetic resinous threaded closure of the type described, in which the tamper evident ring includes pivotally mounted hook-like retaining members which will be deflected radially outwardly during the engagement of the closure upon contact with threads on the container finish, and returned to their normally inwardly directed orientation after passing the lower end of the threads. When the closure is unthreaded, the hook-like members again become disposed in the recess between the lower most end of the thread and prevent removal of the ring with the body of the closure as the frangible bridge is broken. In addition, at least one of the hook-like members engages a weakened portion of the ring and ruptures the ring itself before the closure is completely removed. As a result, the ring is normally removed in ruptured condition at least partially attached to the lower edge of the closure at the time of the first opening of the container.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
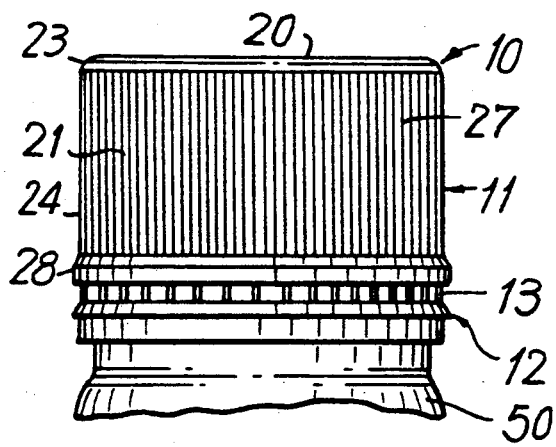
FIG. 1 is a side elevational view of a closure embodying the invention.
Figure 3:
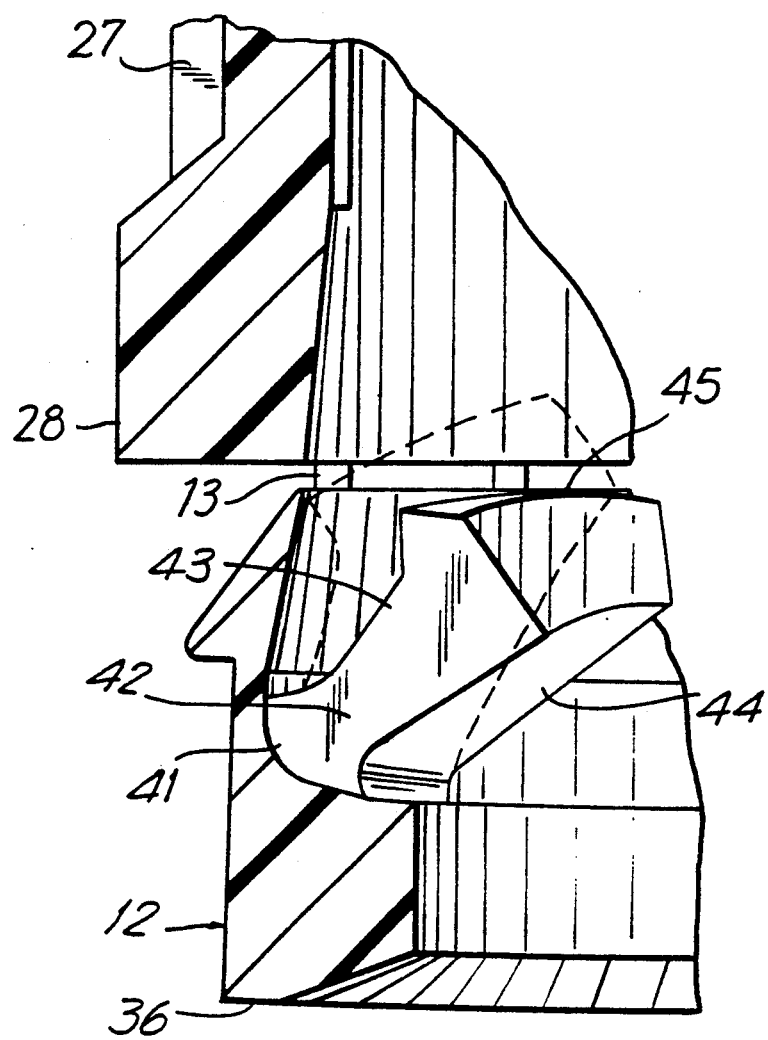
FIG. 3 is a fragmentary greatly enlarged sectional view thereof corresponding to the lower left hand portion of FIG. 2.
Figure 2:
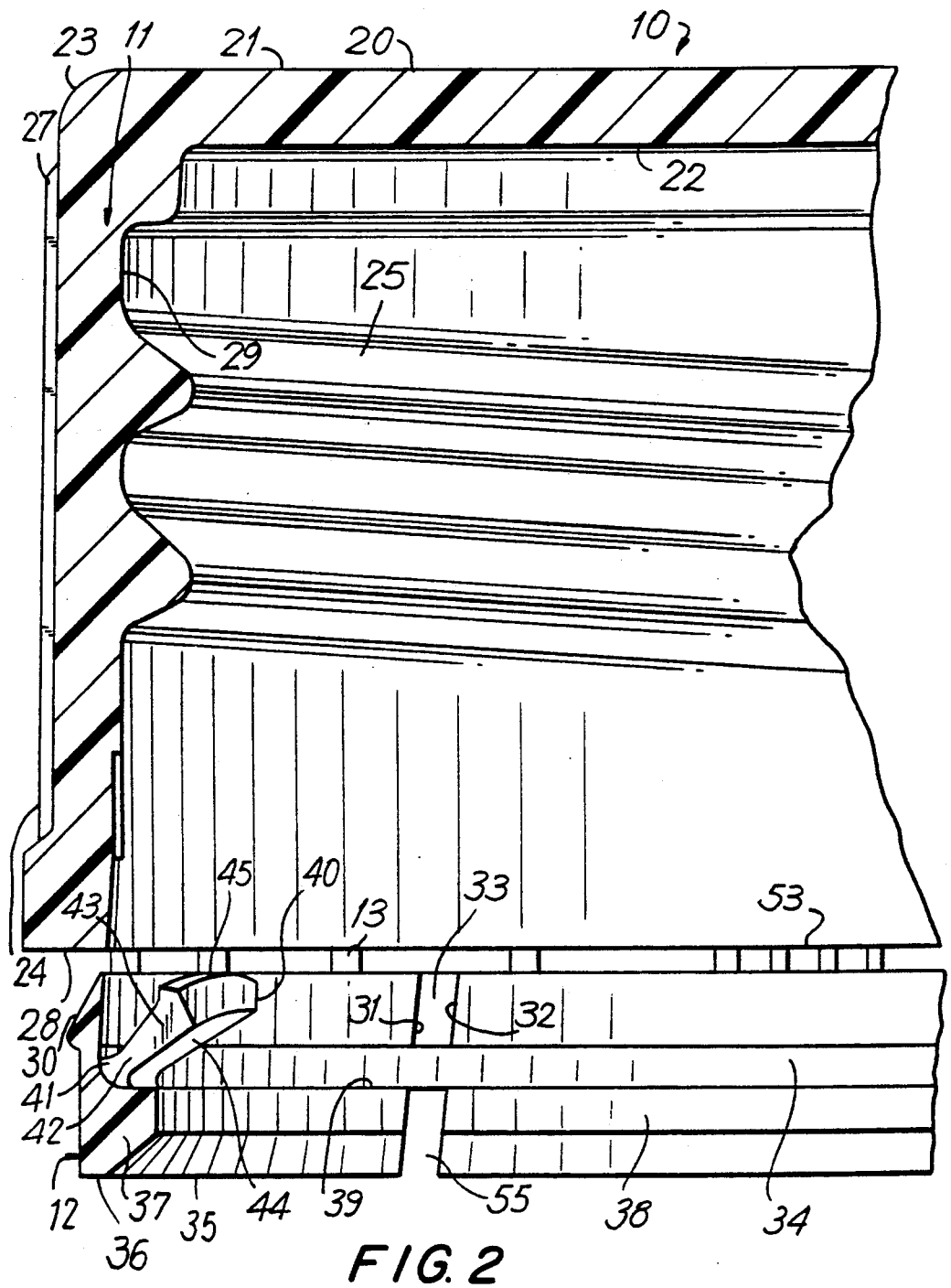
FIG. 2 is a longitudinal central sectional view thereof.

In accordance with the invention, the device, generally indicated by reference character 10 is formed as a unitary synthetic resinous molding to include a main body element 11, a separable tamper evident ring element 12 interconnected by a frangible bridge element 13. While the device may be formed from a variety of synthetic resinous materials, I have found polypropylene to be particularly suitable.

The main body element 11 includes a circular end wall 20 having an outer surface 21, an inner surface 22 and bounded by a peripheral edge 23. A cylindrical wall 24 depends from the end wall 20, and includes an outer serrated surface 27 terminating in a lower beaded edge 28. An inner surface 29 is provided with continuous or interrupted threads.

The tamper evident ring element 12 includes an upper beaded edge 30 terminating in first and second ends 31 and 32 to define a gap 33 therebetween. It interconnects with a relatively central portion 34 which terminates in a lower flared portion 35. Extending inwardly from a lower edge 36 thereof is a radially inwardly extending flange 37 of thickness substantially greater than that of the flared portion 35. It terminates at an inner circular edge 38.

Extending inwardly from the inner surface of the portion 34 are a plurality of hook-like members 40, each including a thickened root portion 41, a flexible bend portion 42 and a hooked inner portion 43 including a body 44 and an enlarged terminal 45.

When the closure 10 is positioned upon a threaded finish 50, the flared portion 35 and hook-like members 40 will move from the positions shown in full lines to those shown in dashed lines, permitting them to slide over the threads 51 on the finish 50 without damage. Once the lower end of the threads has been passed, the members 40 will enter the recess in the finish disposed immediately below the lower end of the threads.

Figure 4:
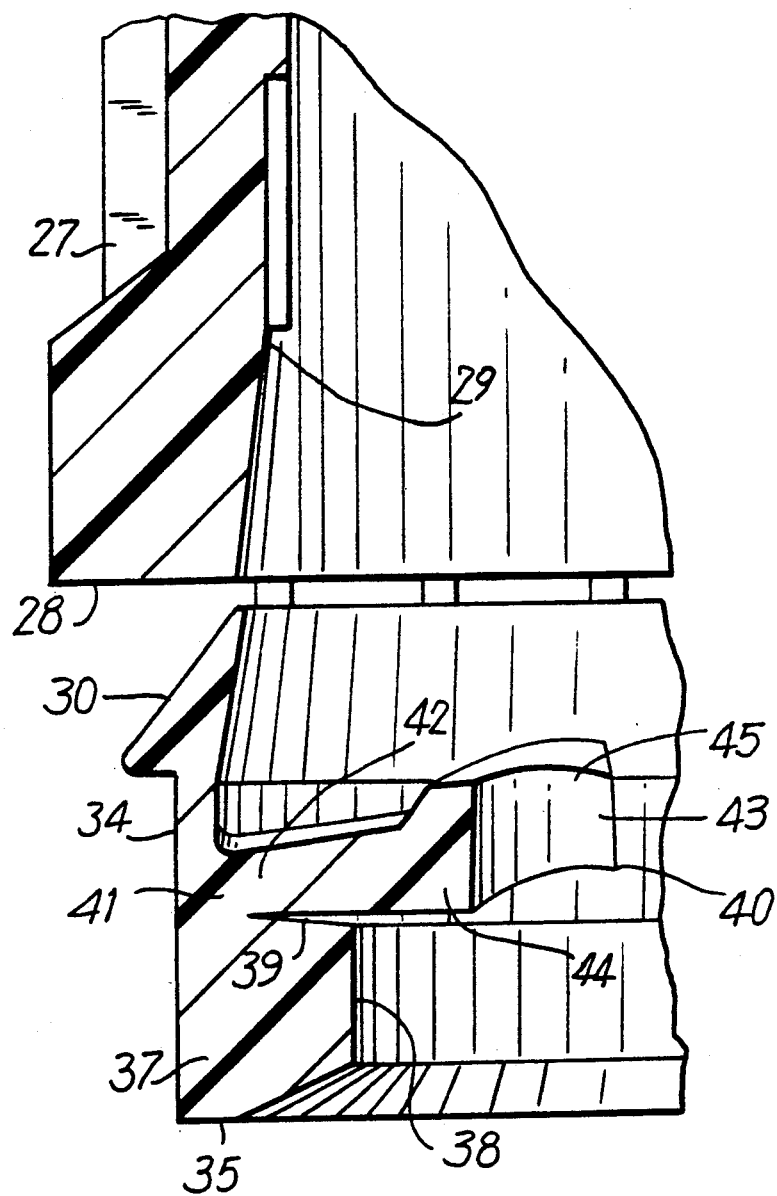
FIG. 4 is a view similar to that seen in FIG. 3, but showing certain of the component parts in altered relative position.

When the closure is unthreaded to open the container, the members 40 will engage the lowermost portions of the thread which will be either circular or helical in configuration, and pivot about the bend portions 52 the position shown in FIG. 4. Subsequent unthreading movement will rupture the bridge 13 in well known manner. It will be observed that the bridge includes a reinforced portion 53 which is more difficult to rupture than the remaining portions of the bridge, and will permit one end of a ruptured ring element 12 to remain attached to the main body element 11 as the unthreading operations continues. With continued rotation, the members 40 pivot inwardly until they contact the upper surface 39 of the flanged portion 35, which will normally occur before the bridge 13 is ruptured. Continued rotation places a radially outward stress on the portion 35, and causes the central portion 34 to rupture in the location of gaps 55 and 33. At this occurrence, the reinforced portion of the bridge will normally remain intact, so that as the unthreading operation continues, the closure will be removed with the ruptured ring element 12 still attached, at which point, it may be manually removed by the user. When the closure is threadedly re-engaged, the ring 12 will be absent, its absence indicating that the closure has been previously opened. When the container is subsequently disposed of, no further action is necessary on the part of the user or the recycler prior to further treatment of the closure.

It will be noted that during the molding process of the closure, the same distortions occur upon removal from the mold, so that sophisticated molding techniques are unnecessary.

I wish it to be understood that I do not consider the invention to be limited to the precise details of structure shown and set forth in this specification, for obvious modifications will occur to those skilled in the art to which the invention pertains.

I claim:

1. In a threaded closure for sealing a container having a corresponding threaded finish, said closure having a tamper-evident ring frangibly interconnected to said closure at a circular free edge thereof, said container defining an annular recess adjacent the inner end of said threaded finish, the improvement comprising: said tamper-evident ring including an upper beaded edge adjacent points of interconnection with said free edge of said closure, a relatively thin medially disposed portion depending from said upper edge, and a lower edge having a radially inwardly directed flange thereon, said flange defining an upper surface; a plurality of radially inwardly directed hook-like members pivotally secured to said medially disposed portion, said hook-like members including a body defining a lower surface and having an enlarged terminal which in unstressed condition is positioned within said annular recess in said container when said closure is engaged upon said threaded finish; said hook-like members flexing radially outwardly during installation of said closure to clear the threads on said finish, said members pivoting within said annular recess during removal of said closure to engage said upper surface of said flange to be supported against further pivotal movement.

2. The improvements set forth in claim 1, further comprising: said upper beaded edge being discontinuous to form a gap defining a weakened area in said medially disposed portion, said flange having a corresponding gap defining a weakened area in said medially disposed portion, said areas causing fractures in said medially disposed portion during removal of said closure.

3. The improvements set forth in claim 2, in which said medially disposed portion is fractured by forces transmitted through said hook-like members.

* * * * *